United States Patent [19]
Swanson

[11] Patent Number: 5,264,230
[45] Date of Patent: Nov. 23, 1993

[54] PROCESS FOR MAKING TOROIDAL WIENERS

[76] Inventor: David Swanson, 1670 Lake Largo Dr., Green Bay, Wis. 54311

[21] Appl. No.: 924,445

[22] Filed: Aug. 4, 1992

[51] Int. Cl.⁵ .................... A22C 11/00; B65B 3/04; B65B 51/10
[52] U.S. Cl. ..................... 426/413; 53/469; 53/476; 53/479; 426/414; 426/512
[58] Field of Search ............ 426/392, 413, 414, 512, 426/513; 53/469, 476, 477, 479; 264/501

[56] References Cited
U.S. PATENT DOCUMENTS

| | | | |
|---|---|---|---|
| 3,495,992 | 2/1970 | De For | 426/413 X |
| 3,781,447 | 12/1973 | Durso | 426/513 |
| 3,857,330 | 12/1974 | Ruckstaetter | 99/354 |
| 4,778,686 | 10/1988 | Chauvin | 426/413 X |

Primary Examiner—Leo B. Tentoni
Attorney, Agent, or Firm—Russell L. Johnson

[57] ABSTRACT

This invention is for a process for making a formed, and compressed food material into a toroidal shape, between two continuous sheets of food grade plastic film, which are sealed to each other around the inner and outer perimeters of the toroidal shape. The process employs two polygonal forming cylinders which are translatable towards each other to perform the the forming, compressing, and sealing steps by translational motion of at least one of the cylinders, and thereafter to advance the food package formed thereby by the rotation of the polygonal cylinders. The process is characterized by its capability to preserve the purity of the food materials passing through the process.

2 Claims, 4 Drawing Sheets

PROCESS FOR MAKING TOROIDAL WIENERS

BACKGROUND

The hamburger and the hot dog are two American institutions. The fast food business has not given the hot dog the attention that has been given the burger. Every kind of meat fill imaginable has been marketed in a hamburger bun. The hamburger bun is far more convenient for the fast food industry than the hot dog bun. Yet, the fast food industry has not heretofore, been successful in marketing a hot dog in a hamburger bun.

One significant barrier to putting a wiener or other wiener shaped meat package in a hamburger bun is that the two shapes are incompatible. Sausages such as wieners are made by grinding up meats and other additives and stuffing the material into a tubular elongate casing where the sausage is cooked. The casing is then removed before eating the sausage. Modern sausages sometimes are provided with edible casings. Some wieners are cooked in reuseable forms and are sold as skinless wieners.

PRIOR ART

It is a well known practice to tie the two ends of a sausage together for cooking. Such ring shaped sausages are common but are usually cut into pieces for eating and to remove the casings.

The notion of an annular or toroidal wiener is an appealing one. The prior art is replete with attempts to develop a practical commercial process for producing such a product.

U.S. Pat. No. 3,781,447 to Durso, teaches a process for forming sausage materials into an annular shape in molds and cooking the materials while in the molds to form a skinless annular sausage. Processes such as that of Durso present very difficult health and sanitation problems related to cleanup between runs.

U.S. Pat. No. 4,778,686 to Chauvin teaches a process for forming molded toroidal sausage wherein the sausage is provided with an edible or removable wrap. Processes such as that of Chauvin do not readily lend themselves to large volume production because of the positioning and control problems associated with the wrap.

U.S. Pat. No. 3,857,330 to Ruckstaetter, teaches a process for forming a toroid shaped hot dog by means of injecting filler material into a toroid shaped casing retained within a mold. Processes such as that of Ruckstaetter present difficulties with the positioning of the casing within the mold and the positioning of the filler nozzle tip in the opening of the casing so that high speed production by this process is not readily achievable.

The above cited prior art processes contain a number of the operations found in the instant invention. The products formed by the prior art processes contain a number of the attributes of the products formed by the instant process.

However, the instant process provides a novel combination of process steps that provide a novel product. More specifically, the instant process enables the rapid and efficient formation of a toroidal wiener, which is essential so that the process can be commercially practical in today's competitive markets. Further, the process enables the maintenance of sanitation and purity of the product during and after manufacture.

OBJECTS

It is therefore an object of this invention to provide a process for forming toroidal wieners wherein the process provides a high degree of sanitation and protection for the product being formed.

It is further an object of this invention to provide the process described above wherein the process is capable of forming large quantities of the product being formed in a short time.

It is further an object of this invention to provide the process described above wherein the the process forms, compresses and seals the product being formed in a wrap in a single operation.

Other objects will be made apparent by the following specifications, drawings and claims.

BRIEF DESCRIPTION OF THE INVENTION

A critical and novel element of the invention is the employment of two polygonal forming cylinders having flat forming surfaces that can be brought together to, in a single operation, form, compress, and seal a filler material between two continuous sheets of vacuum formable, and sealable food grade packaging films.

The process comprises the steps of;
1) Unwinding a bottom sheet of film,
2) Laying the bottom sheet of film on a flat surface of a first polygonal forming cylinder, said surface being provided thereon with a half form for a toroidal shape, a means for vacuum forming the film in the half form, and a means for sealing the film to a top sheet of film,
3) Vacuum forming the bottom sheet of film into the half form,
4) Advancing the polygonal cylinder to a fill position,
5) Depositing a measured amount of fill material in the half form,
6) Unwinding a top sheet of film,
7) Laying the top sheet of film on a second flat surface of a second polygonal cylinder said second flat surface being provided thereon with a second half form of a toroidal shape, a means for vacuum forming the film in the half form, and a means for sealing the top sheet with the bottom sheet, and the first polygonal cylinder has its axial elements parallel to the axial elements of the second polygonal cylinder,
8) Forming the filler material into a toroidal shape by bringing the first half form and the second half form together, compressing the material, and sealing the top sheet to the bottom sheet around the outside perimeter and the inside perimeter of the toroidal shape to form a shaped, compressed, and sealed package, and
9) releasing the sealed unit for further processing.

DETAILED DESCRIPTION

Figure 1:
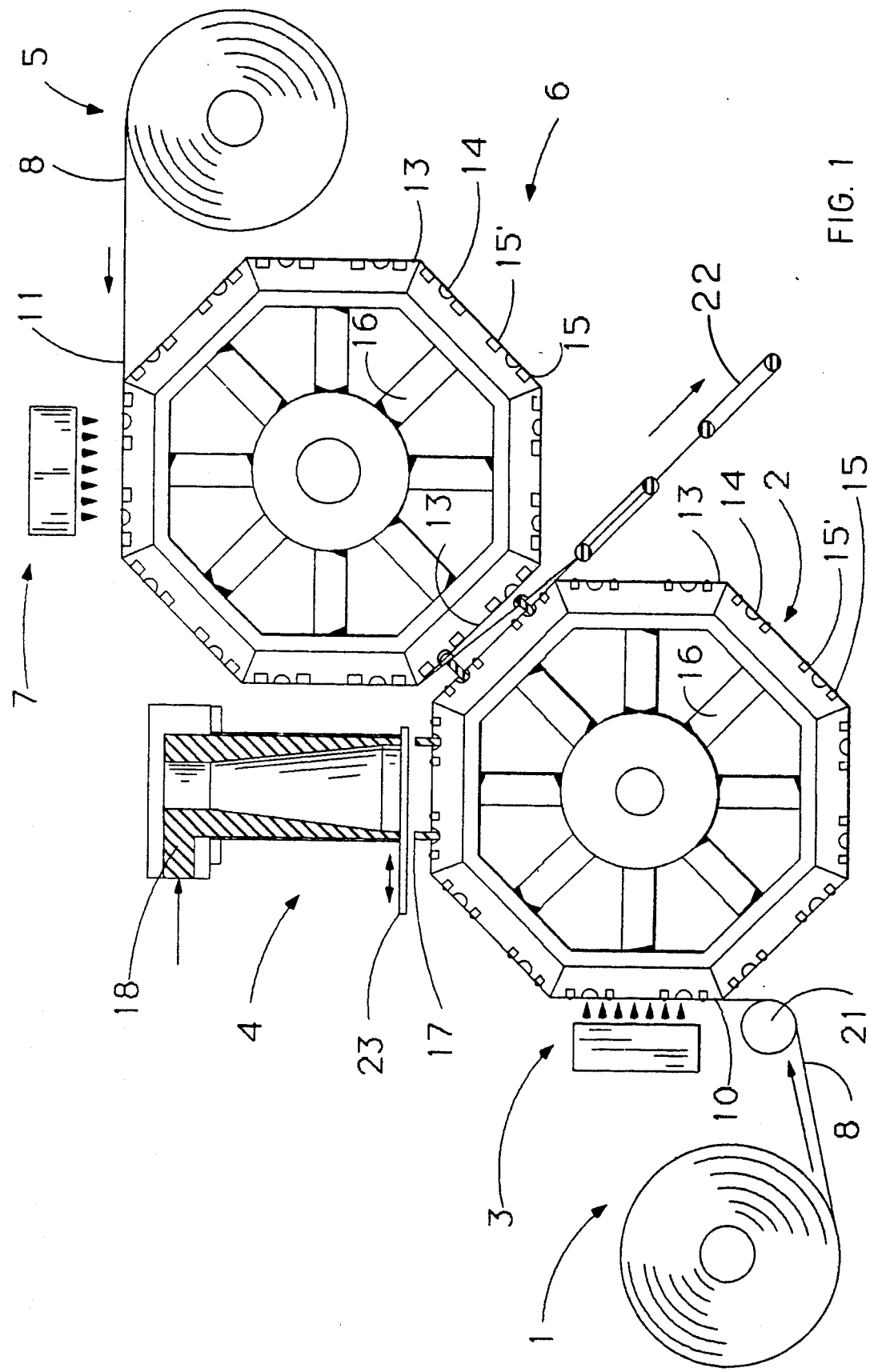
FIG. 1 is an elevational partially sectioned schematic drawing of the process of this invention showing the forming cylinders apart.

In the drawings like numbers refer to like objects and the proportions of some elements have been exaggerated for the sake of illustration.

Figure 2:
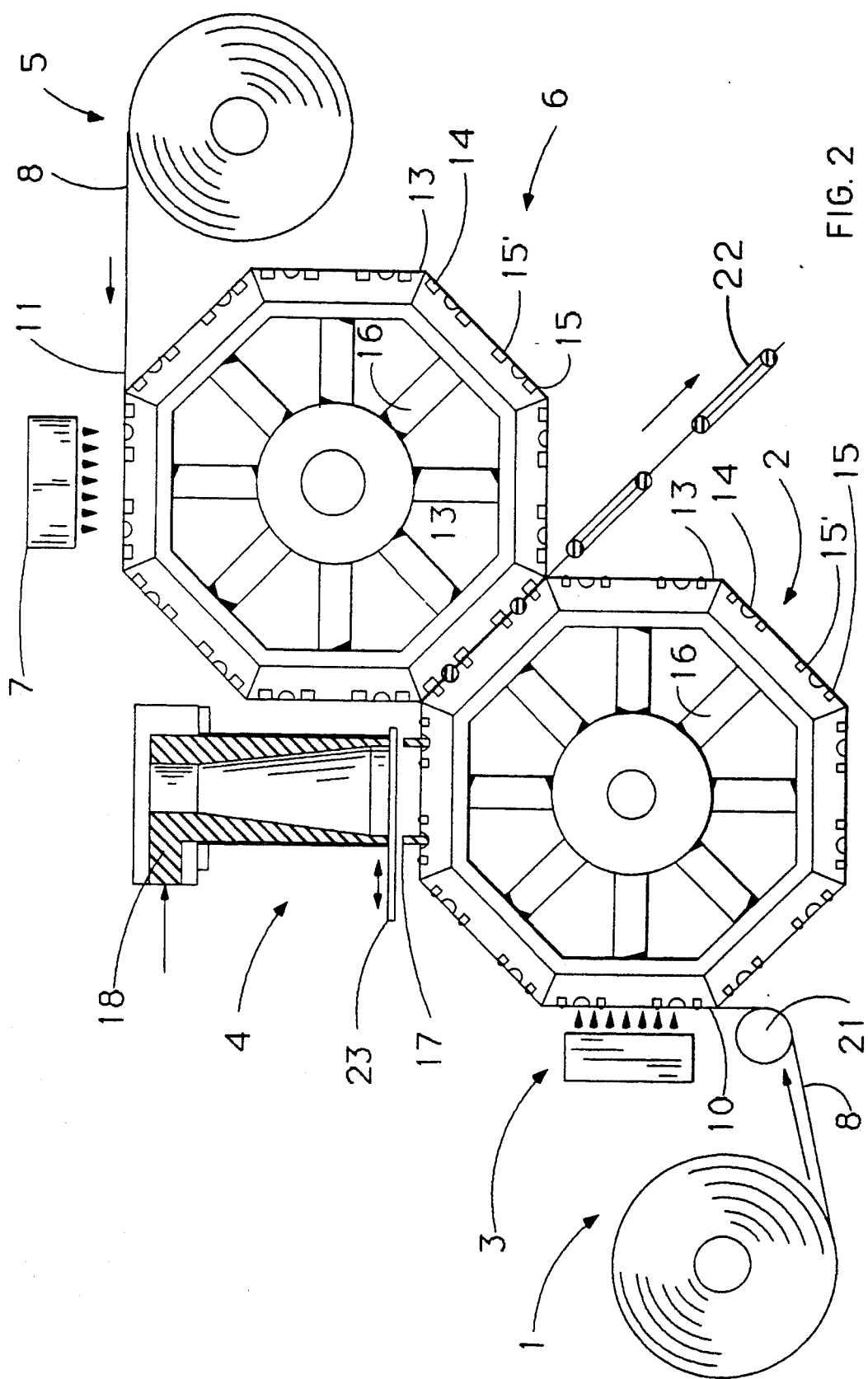
FIG. 2 is the drawing of FIG. 1 wherein the cylinders are shown together.
Figure 3:
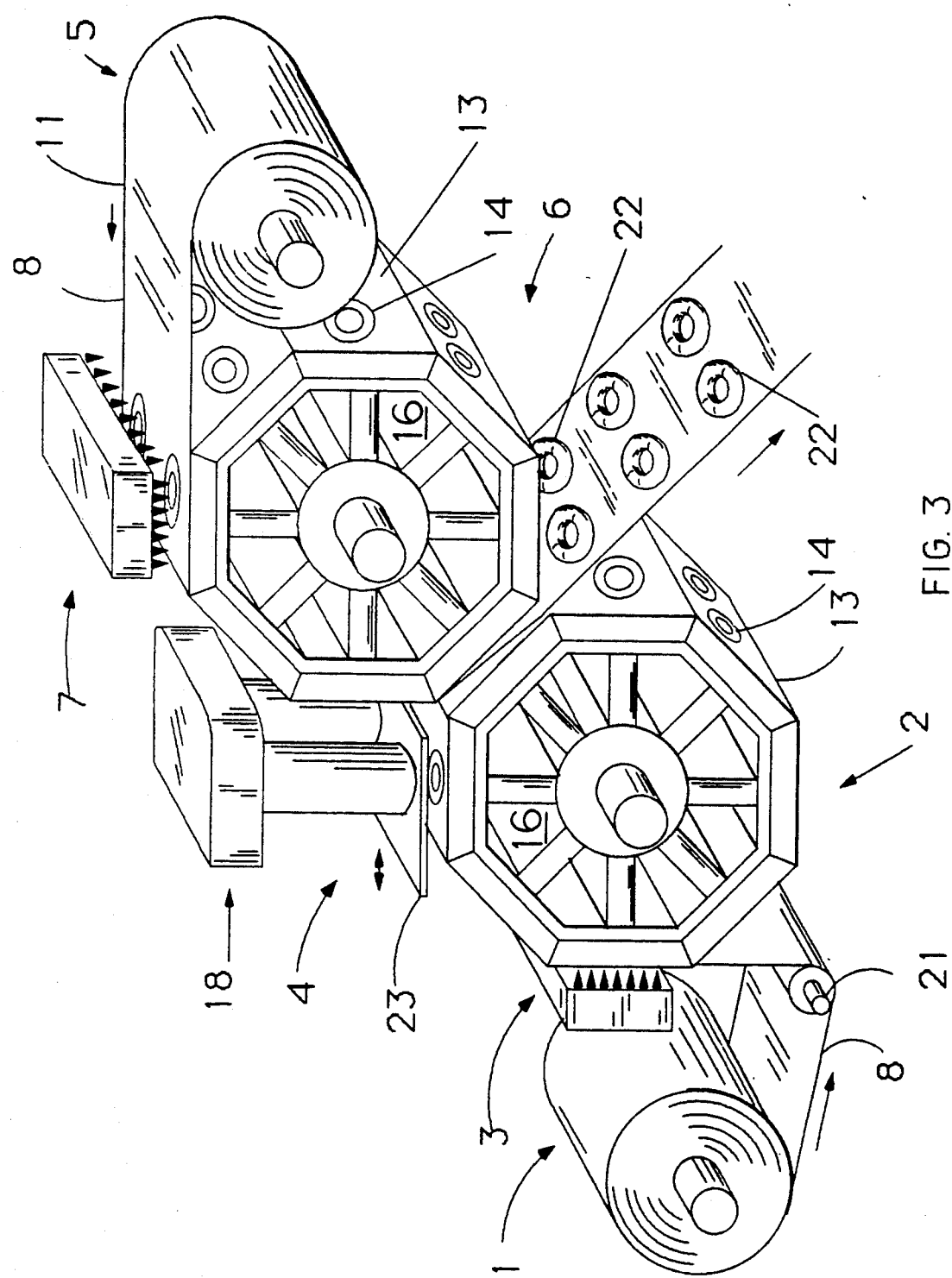
FIG. 3 is a schematic pictorial view of the process of FIGS. 1 and 2.

Referring now to FIGS. 1 through 3 wherein the steps of the process of this invention are illustrated schematically.

The process of this invention comprises the following principle components; a first film unwind 1, a first polygonal forming cylinder 2, a first heating means 3, a filler material dispenser 4, a second film unwind 5, a second polyqonal forming cylinder 6, and a second heating means 7.

A number of the steps of this process can best be performed when the materials in process are not in motion. However, in order to produce large quantities of products in relatively short times, continuous rotary motion is preferred. The process of this invention is a compromise between these two seemingly contradictory requirements. Simplified for the sake of illustration; the machine advances all of the components of the product by rotary motion along continuous flow paths, and then pauses for a number of seconds to perform, simultaneously, all of the process steps that are best performed with the materials in process, not moving, and then again advances all of the components.

Unwinds 1 and 5 are standard roll unwinds and the film 8, being unwound therefrom is a food grade film that is heat formable and heat sealable, such as Curlon Grade 644 manufactured by the Curwood division of the Bemis Corporation of Oshkosh Wis. The process of this invention preserves the cleanliness and hygienic properties of the film and this feature of the process is of critical importance to its commercial success. The film 8 unwound from unwind 1 forms bottom sheet 10 while the film 8 unwound from unwind 5 forms top sheet 11.

Polygonal forming cylinders 2 and 6 have their axes of rotation parallel to each other. The outer surfaces of the cylinders are formed of a series of flat surfaces 13 which are equally distributed around cylinders 2 and 6. Each flat surface has formed therein at least one, half form 14, of a toroidal shape, and the half forms 14 of cylinder 2 are in indexing relationship with the half forms 14 of cylinder 6. Half forms 14 have around their inner and outer perimeters sealing elements 15 and 15'. Half forms 14 are operably connected to vacuum lines 16 which enables film 8 to be vacuum formed into forms 14.

Dispenser 4 is an extrusion type forming unit which extrudes a short cylindrical section of fill material 18.

Heating means 3 and 7 may be any suitable heating means such as a quartz infrared heater of the type made by the Glenro Corp. of Patterson N.J.

A full cycle of operation involves the advancement of cylinders 2 and 6 one rotational increment followed by the operational steps which occur with cylinders 2 and 6 not rotating, followed by the initiation of a new cycle.

As bottom sheet 10 progresses through the process, the operational steps are as follows. Bottom sheet 10 is guided onto a flat surface 13 of first polygonal cylinder 2. On the first stop of the rotation of cylinder 2, heater 3 heats sheet 10 and sheet 10 is drawn into half form 14 of flat surface 13 by means of a vacuum provided to half form 14 by means of vacuum lines 16. At the next stop of the rotation, the vacuum formed portion of sheet 10 is allowed to cool to form what is in effect a formed plastic liner for form 14. At a subsequent rotational stop, filler material dispenser 4, extrudes a short cylindrical segment 17 of filler material 18 which is cut off to a measured portion by cut off means 23 and deposited into form 14. At the next stop bottom sheet 10 in form 14 of flat surface 13 of cylinder 2 and carrying segment 17 of filler material 18 is positioned opposite the form 14 of flat surface 13 of second polygonal cylinder 6. Form 14 of second polygonal cylinder 6 has at this point in the process been provided with top sheet 11 which has been vacuum formed in form 14 in a manner similar to that described in relation to bottom sheet 10. Second polygonal cylinder 6 is then moved translationally to contact first polygonal cylinder 2 so that flat surfaces 13 of cylinders 2 and 6 are proximal. As a part of this operational step the following steps are performed, essentially, simultaneously.

1) Filler material 18 is formed into an annular or toroidal shape that fills the two mating half forms 14.
2) Filler material 18 is compressed to give the fill material the desired firmness and texture for the product being formed.
3) Bottom sheet 10 and top sheet 11 are sealed to each other by the operation of heat sealing elements 15 and 15' forming heat seals 20 and 19 around the outside and inside perimeters of half form 14 to create a sealed package 22.

The next incremental rotation of cylinders 2 and 6 discharges the sealed package 22 for further processing.

The above disclosures and descriptions of the process of this invention is enabling, such that one skilled in the art could practice the process without undue experimentation. However, it is deemed desirable by the inventor to particularly point out the scope of some of the critical elements of the invention and emphasize those elements which he regards as novel.

The forming of a toroidal shaped food package between two continuous sheets of food grade film to preserve the purity of the food during and after processing, is believed, by the inventor, to be novel.

The use of polygonal cylinders with half forms in the faces of the cylinders and the translating of the cylinders to bring mating faces into contact to form, compress, and heat seal a food package between two layers of two continuous webs of film and thereafter advancing the webs of film by rotation of the cylinders is believed, by the inventor to be a novel process sequence.

The drawings in FIGS. 1 through 3, show the polygonal cylinders 2 and 6 to be octagonal in cross section. The selection of the number of sides for the polygonal cylinders is a matter of design choice and is dependent on design considerations that are not a part of this invention. Therefore, the scope of this invention should be seen as encompassing polygonal cylinders whose cross section is an equilateral polygon of an order greater than 5.

Figure 4:
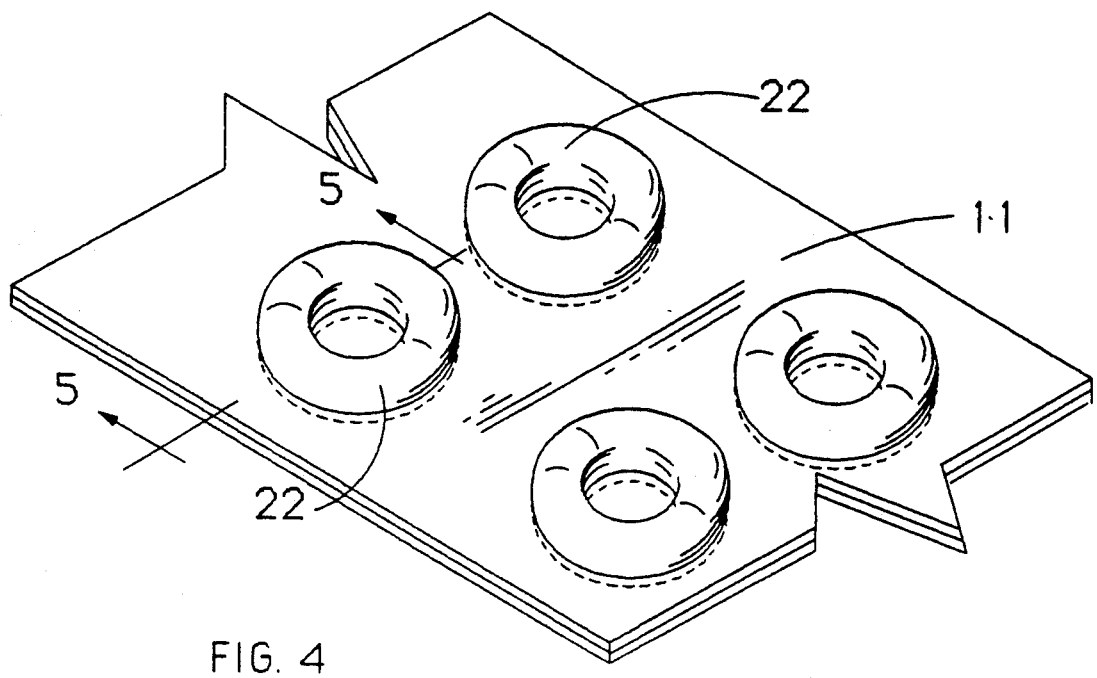
FIG. 4 is a pictorial view of the products produced by the process of FIGS. 1 through 3.
Figure 5:
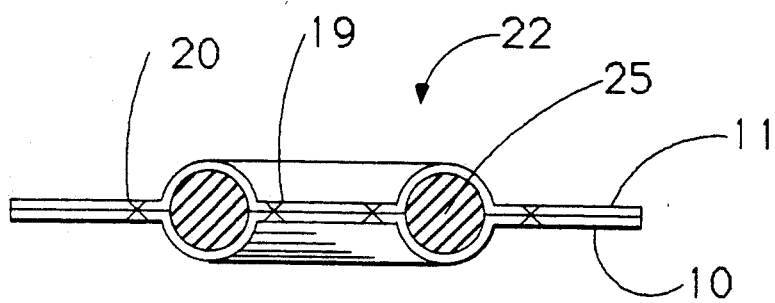
FIG. 5 is a sectioned elevational view of of a product taken along the line 5—5 of FIG. 4.

As illustrated in FIGS. 3 and 4, each flat surface of polygonal cylinders 2 and 6 can contain more than one half form 14 so that more than one package 22 is formed in each full cycle.

Figure 6:
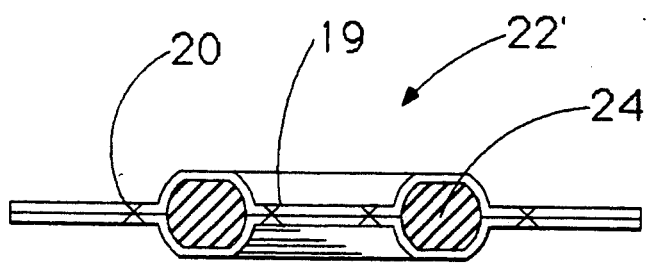
FIG. 6 is a sectional elevational view of an alternative cross section of the product of this invention.

The shape of the food package 22 is described above as toroidal or annular. These terms should be read to mean generally toroidal and generally annular. As illustrated in FIG. 6, it is within the scope of this invention to give sealed package a modified toroidal shape by altering cross sectional shape 24 of sealed package 22'.

The expression "for further processing" is used herein to indicate the disposal of the sealed packages as they leave the process of this invention. Such further processing might include; pre-cooking the packaged material, labeling, cutting the packages apart, and packing the packages for shipping. These are a few of the typical operations that are well known in the art and would be understood to come under the heading of "further processing".

The above descriptions of the instant invention are enabling but do not present all the variants of the product forms and serviceable components that would be within the scope of the process of this invention. Therefore, it should be understood that the scope of this invention should not be limited by the disclosures of this specifications, but rather the scope of this invention should only be limited by the scope of the appended claims and to all equivalents thereto that would be made obvious thereby to one skilled in the art.

I claim:

1. A process for forming and compressing a food material into a toroidal shape between two continuous sheets of food grade plastic film and comprising; the steps of;
   1) Unwinding a bottom sheet of food grade film,
   2) Laying the bottom sheet of film on a flat surface of a first polygonal forming cylinder, said surface being provided thereon with a half form for a toroidal shape, a means for vacuum forming the film in the half form, and a means for sealing the bottom sheet to a top sheet of food grade film,
   3) Vacuum forming the bottom sheet of film into the half form,
   4) Advancing the polygonal cylinder to a fill position,
   5) Depositing a measured amount of food material in the half form,
   6) Unwinding a top sheet of food grade film,
   7) Laying the top sheet of film on a second flat surface of a second polygonal cylinder, said second flat surface being provided thereon with a second half form of a toroidal shape, a means for vacuum forming the film in the half form, and a means for sealing the top sheet with the bottom sheet, and the first polygonal cylinder has its axial elements parallel to the axial elements of the second polygonal cylinder,
   8) Forming the filler material into a toroidal shape by bringing the first half form and the second half form together by means of translating at least one of the polygonal cylinders towards the other polygonal cylinder, compressing the material and sealing the top sheet to the bottom sheet around the outside perimeter and the inside perimeter of the toroidal shape to form a shaped, compressed and sealed, packaged food unit, and
   9) Releasing the sealed and packaged unit for further processing.

2. The process of claim 1 wherein the flat surfaces of the polygonal cylinders are provided with more than one half form and more then one packaged food product is formed each time the the first flat surface and the second flat surface are brought together.

* * * * *